US012716746B2

(12) United States Patent
Katayama

(10) Patent No.: US 12,716,746 B2
(45) Date of Patent: Aug. 25, 2026

(54) IN-VEHICLE INFORMATION PROCESSING DEVICE, MAP DATA MANAGEMENT CENTER DEVICE, AND MAP DATA MANAGEMENT SYSTEM

(71) Applicant: Hitachi Astemo, Ltd., Hitachinaka (JP)

(72) Inventor: Mitsugu Katayama, Tokyo (JP)

(73) Assignee: Hitachi Astemo, Ltd., Hitachinaka (JP)

(*) Notice: Subject to any disclaimer, the term of this patent is extended or adjusted under 35 U.S.C. 154(b) by 251 days.

(21) Appl. No.: 18/573,960

(22) PCT Filed: Mar. 2, 2022

(86) PCT No.: PCT/JP2022/008982
§ 371 (c)(1),
(2) Date: Dec. 22, 2023

(87) PCT Pub. No.: WO2023/276277
PCT Pub. Date: Jan. 5, 2023

(65) Prior Publication Data

US 2024/0328820 A1 Oct. 3, 2024

(30) Foreign Application Priority Data

Jun. 28, 2021 (JP) ................................. 2021-106408

(51) Int. Cl.
*G01C 21/00* (2006.01)
*G06V 20/56* (2022.01)
*G08G 1/16* (2006.01)

(52) U.S. Cl.
CPC ....... *G01C 21/3822* (2020.08); *G06V 20/588* (2022.01); *G08G 1/167* (2013.01)

(58) Field of Classification Search
None
See application file for complete search history.

(56) References Cited

U.S. PATENT DOCUMENTS

2008/0077326 A1* 3/2008 Funk ....................... G01S 19/49 701/500
2011/0106449 A1* 5/2011 Chowdhary ......... G01C 21/005 701/472

(Continued)

FOREIGN PATENT DOCUMENTS

JP 2014-211756 A 11/2014
JP 2017-102638 A 6/2017
JP 2019164611 A * 9/2019

OTHER PUBLICATIONS

International Search Report with English Translation of International Patent Application No. PCT/JP2022/008982 dated Apr. 26, 2022 (5 pages).

*Primary Examiner* — Muhammad Adnan
(74) *Attorney, Agent, or Firm* — Foley & Lardner LLP

(57) ABSTRACT

An object of the present invention is to detect a step elimination region according to a road surface situation of a road and to allow a moving body to travel in more realistic manner. In order to solve the above problem, the present invention is an in-vehicle information processing device which is connected to a sensor 2 and implemented by an MPU 7 provided in a vehicle 1, the in-vehicle information processing device including: a curbstone shape detection unit 3 that detects a curbstone shape, which is a step situation on a road surface, by using a road surface situation of a road on which the vehicle 1 moves, the road surface situation being detected by the sensor 2; a passage caution spot detection unit 5 that detects a passage caution spot, which is a type of a step elimination region satisfying a predetermined condition, on the basis of the curbstone shape; and an output unit that outputs the passage caution spot information.

13 Claims, 12 Drawing Sheets

(56) References Cited

U.S. PATENT DOCUMENTS

2012/0169530 A1* 7/2012 Padmanabhan ......... G01S 15/89
342/146
2012/0185167 A1* 7/2012 Higuchi ............... G06V 20/588
382/104
2013/0297198 A1* 11/2013 Vande Velde .......... G01C 21/28
701/409
2015/0269446 A1* 9/2015 Takemae ................... G06T 7/12
382/199
2016/0082978 A1 3/2016 Ozaki et al.
2018/0022347 A1* 1/2018 Myers .................. G06V 20/588
701/26
2019/0340447 A1* 11/2019 Wei ...................... G06V 20/588
2020/0193193 A1* 6/2020 Okada .................. G06V 20/586
2020/0329215 A1* 10/2020 Tsunashima ............ G06T 7/593
2020/0377088 A1* 12/2020 Fukushige .......... B60W 40/105
2021/0224562 A1* 7/2021 Zhan ...................... G06V 20/58
2022/0194362 A1* 6/2022 Ueki ............... B60W 60/00253
2022/0196410 A1* 6/2022 Hines ..................... G06V 20/64
2024/0428556 A1* 12/2024 Lee ...................... G06V 20/588

* cited by examiner

IN-VEHICLE INFORMATION PROCESSING DEVICE, MAP DATA MANAGEMENT CENTER DEVICE, AND MAP DATA MANAGEMENT SYSTEM

TECHNICAL FIELD

The present invention relates to an information processing technique for executing processing according to a result of detecting a situation of a road.

Among them, the present invention particularly relates to information processing of detecting whether or not an outside of a road (roadway) called a roadside, a shoulder, or the like is in a predetermined situation and using a result thereof.

BACKGROUND ART

Currently, processing for automatic driving and driving assistance is performed as information processing according to a situation of a road. In these automatic driving and driving assistance, it is necessary to detect surrounding objects on the outside of the road as a passage caution spot. For example, PTL 1 describes a spot where a doorway of a building is present and an intersection. In addition, PTL 2 describes that the presence or absence of a guardrail is used as a determination material for recording a travel risk for each road section.

CITATION LIST

Patent Literatures

PTL 1: JP 2019-164611 A
PTL 2: JP 2014-211756 A

SUMMARY OF INVENTION

Technical Problem

As described above, PTLs 1 and 2 disclose a technique of detecting, for the outside of the road, an entry region which has a relatively high possibility that others enter. In order to spread the automatic driving and the driving assistance, it is desirable to share such an entry region in each automobile and driver.

Here, the ease of entry of others into the road also varies depending on the road surface of the road. For example, a pedestrian, a bicycle, or the like may jump out in a region where a curbstone of a road between a sidewalk and a roadway is cut or a region where a slope is formed. That is, in addition to the doorway of the building of PTLs 1 and 2, an entry region is present on the road. Therefore, it is necessary to detect the entry region according to the road surface.

Solution to Problem

In this regard, in the present invention, it is detected whether a road surface is a step elimination region which is an entry region, and the road surface is managed separately from other regions. Here, the step elimination region indicates a state where a step situation on the road surface satisfies a predetermined condition, and includes a region where a curbstone is cut or a region where a slope is formed. Note that the predetermined condition of the step situation is a condition related to a height difference between a road (roadway) and an adjacent region, and includes a case where there is no curbstone, a case where the height difference is equal to or less than a predetermined value, and a case where an inclination is equal to or less than a predetermined value.

A more specific configuration of the present invention is an in-vehicle information processing device which is connected to a sensor and provided in a moving body, the in-vehicle information processing device including: a step situation detection unit that detects a step situation on a road surface by using a road surface situation of a road on which the moving body moves, the road surface situation being detected by the sensor; a step elimination region detection unit that detects a step elimination region satisfying a predetermined condition on the basis of the step situation; and an output unit that outputs step elimination region information indicating the step elimination region.

In addition, the present invention also includes a map data management center device connected to an in-vehicle information processing device and a map data management system including the devices. Further, the present invention also includes a method using these, a program for causing an in-vehicle information processing device and a map data management center device to function, and a storage medium having the program stored thereon.

Advantageous Effects of Invention

According to the present invention, it is possible to detect a step elimination region according to a road surface situation of a road, and it is possible to allow a moving body to travel in more realistic manner.

DESCRIPTION OF EMBODIMENTS

Hereinafter, embodiments of the invention will be described. In the present embodiment, as an example of a step elimination region of a road, a passage caution spot is specified, and a vehicle 1 which is a moving body is controlled on the basis of the specified passage caution spot.

Figure 1:
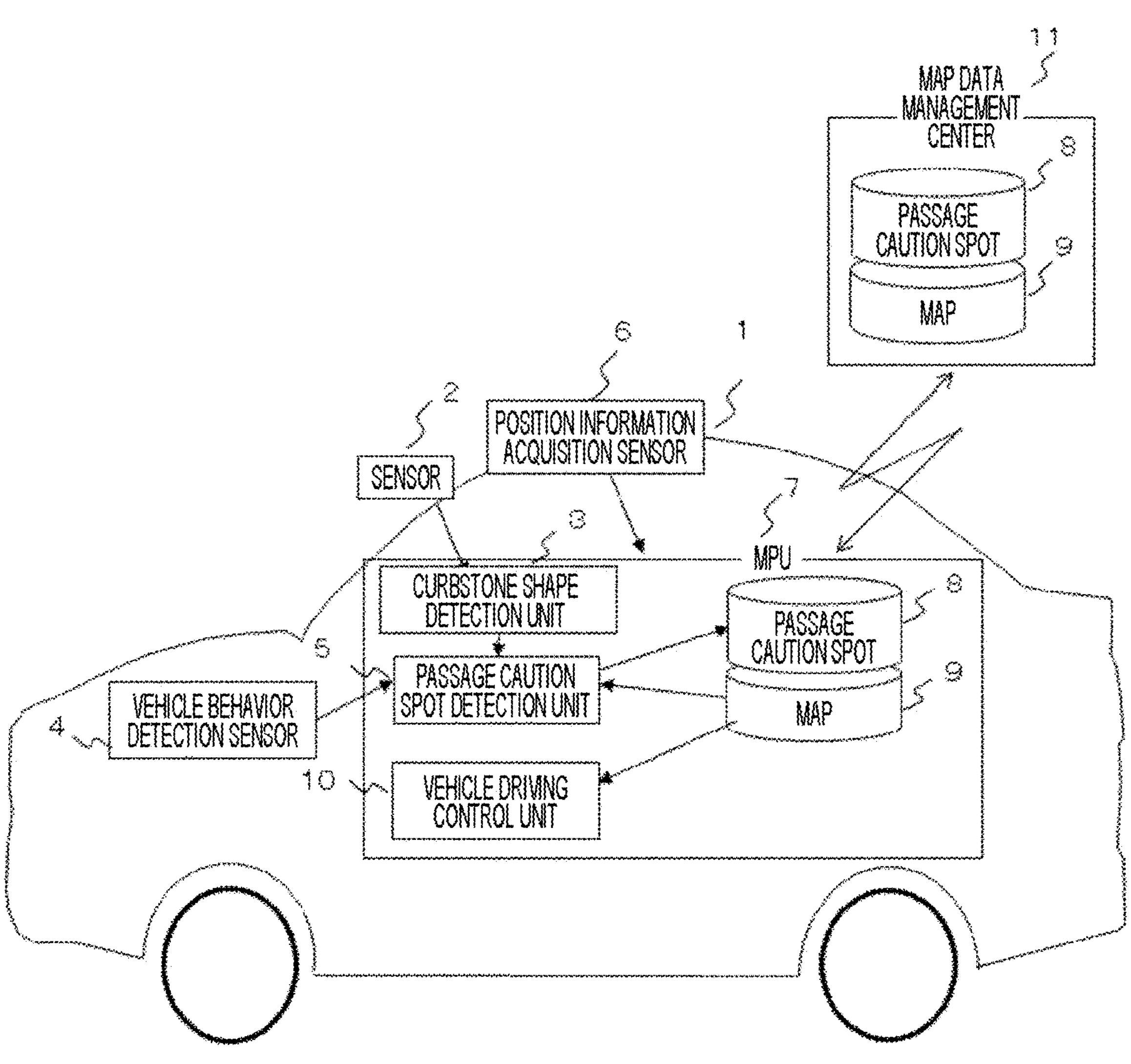
FIG. 1 is a diagram illustrating a system configuration according to an embodiment of the present invention.

FIG. 1 is a diagram illustrating a system configuration according to an embodiment of the present invention. In the present embodiment, the vehicle 1, which is a type of the moving body, and a map data management center 11 realized as a server capable of communicating with the vehicle 1 are provided.

Here, the vehicle 1 includes, as sensors for detecting various situations, a sensor 2 for detecting a state of a curbstone of a road, a position information acquisition sensor 6 for acquiring position information of the vehicle 1, and a vehicle behavior detection sensor 4 for acquiring a behavior of the vehicle 1 in a traveling state.

Then, these sensors are connected to an MPU 7, which is an in-vehicle information processing device, via an in-vehicle network. The MPU 7 is a map position management system (Map Position Unit).

For this purpose, the MPU 7 includes a storage unit (database) that stores passage caution spot information 8 and map information 9. Further, the MPU 7 executes the following various types of processing (functions) by using the information and the situation detected by the sensor. That is, the MPU 7 executes each function by a curbstone shape detection unit 3, a passage caution spot detection unit 5, and a vehicle driving control unit 10. A processing unit may execute the processing according to a program, or the processing may be realized by a dedicated circuit (unit). Further, these units may be configured separately from the MPU 7.

The curbstone shape detection unit 3 detects the shape of the curbstone according to the situation of the road surface detected by the sensor 2. Here, the sensor 2 can be realized by an imaging device such as a camera, and the curbstone shape detection unit 3 executes image processing on an image captured by the sensor 2 to detect the shape of the curbstone. Note that the detection of the shape of the curbstone is an example, and the type and detection target of the sensor 2 are not limited to the curbstone. That is, the detection of the curbstone is an example of the detection of the step situation, and the presence or absence of the slope may be detected. As described above, the curbstone shape detection unit 3 is an example of a step situation detection unit. Note that the presence or absence of the slope can be determined by whether the inclination thereof is a predetermined value or less.

In addition, the passage caution spot detection unit 5 detects the place as the passage caution spot from the state of the curbstone and the map information 9, and stores the result as the passage caution spot information 8 in the storage unit. In addition, the vehicle driving control unit 10 controls driving of the vehicle 1 by using the detection results obtained by various sensors, the passage caution spot information 8, and the map information 9. As described above, the passage caution spot detection unit 5 detects a passage caution spot which is a type of the step elimination region. That is, the passage caution spot detection unit 5 is an example of a step elimination region detection unit.

In addition, the passage caution spot information 8 is a type of the step elimination region information indicating the step elimination region.

In addition, the map data management center 11 includes a storage unit that stores the passage caution spot information 8 and the map information 9, and can be realized by a computer called a server. The passage caution spot information 8 and the map information 9 are generated on the basis of the information collected from a plurality of vehicles and distributed to each vehicle. For this reason, the passage caution spot information 8 and the map information 9 of the vehicle are synchronized with the passage caution spot information 8 and the map information 9 of the map data management center 11. In addition, the map data management center 11 may execute the function of at least one of the curbstone shape detection unit 3 or the passage caution spot detection unit 5 described above. These units will be described in detail in each embodiment to be described later, but at least a part thereof may be executed by the map data management center 11. For this reason, the map data management center 11 executes various types of processing and functions according to a program stored in a storage medium. Hereinafter, each embodiment according to the shape and the like of a target road will be described.

First Embodiment

Figure 2:
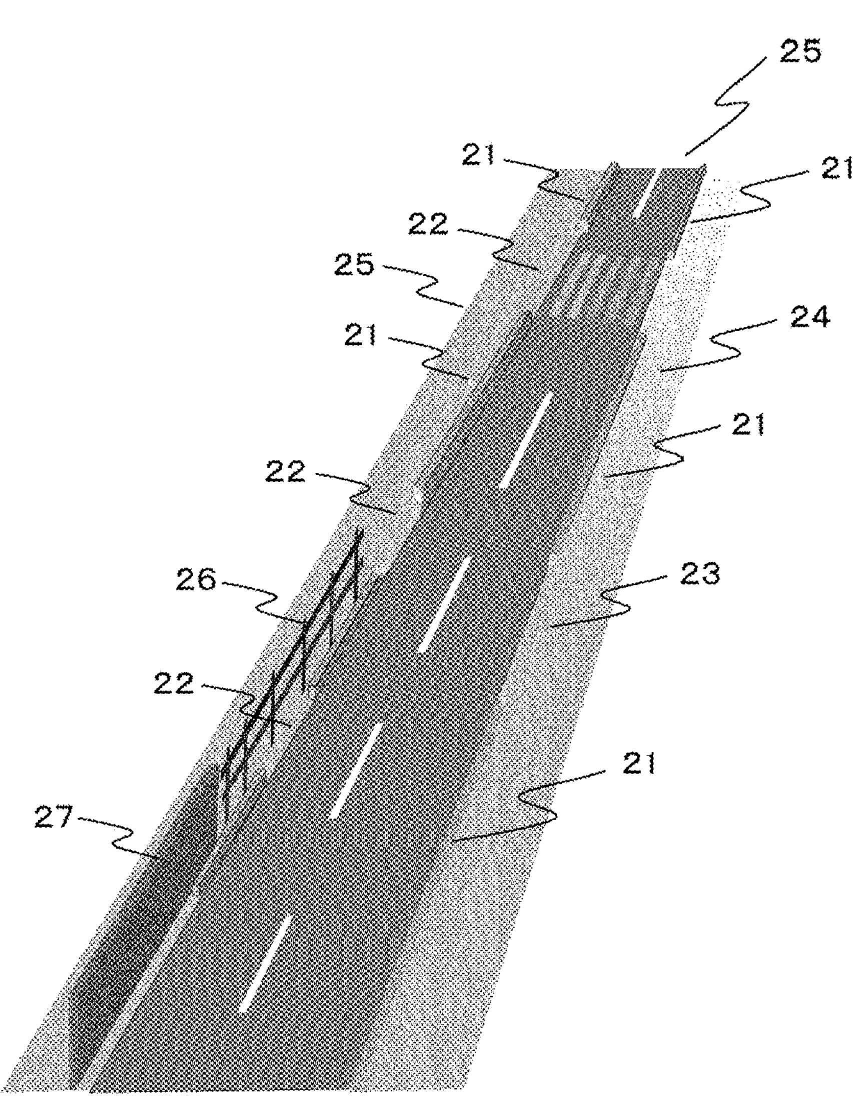
FIG. 2 is a diagram illustrating a road targeted by a first embodiment.

FIG. 2 is a diagram illustrating a road 25 targeted by a first embodiment. At an end of the road 25, there is a curbstone 21, which partitions a sidewalk 24 and the road 25 (roadway). In the present embodiment, a spot 22 with no curbstone and a spot 23 where a curbstone is sloped are detected as the step elimination region. However, in the present embodiment, even if the curbstone is cut, a spot where a guard rail 26 and a wall 27 are present is excluded from the target. Note that the sidewalk 24 may or may not have a step with the road 25. Note that in the present embodiment, the presence or absence of a curbstone is detected, but it may be detected whether a step between the sidewalk 24 and the road 25 is equal to or less than a predetermined difference.

Figure 3:
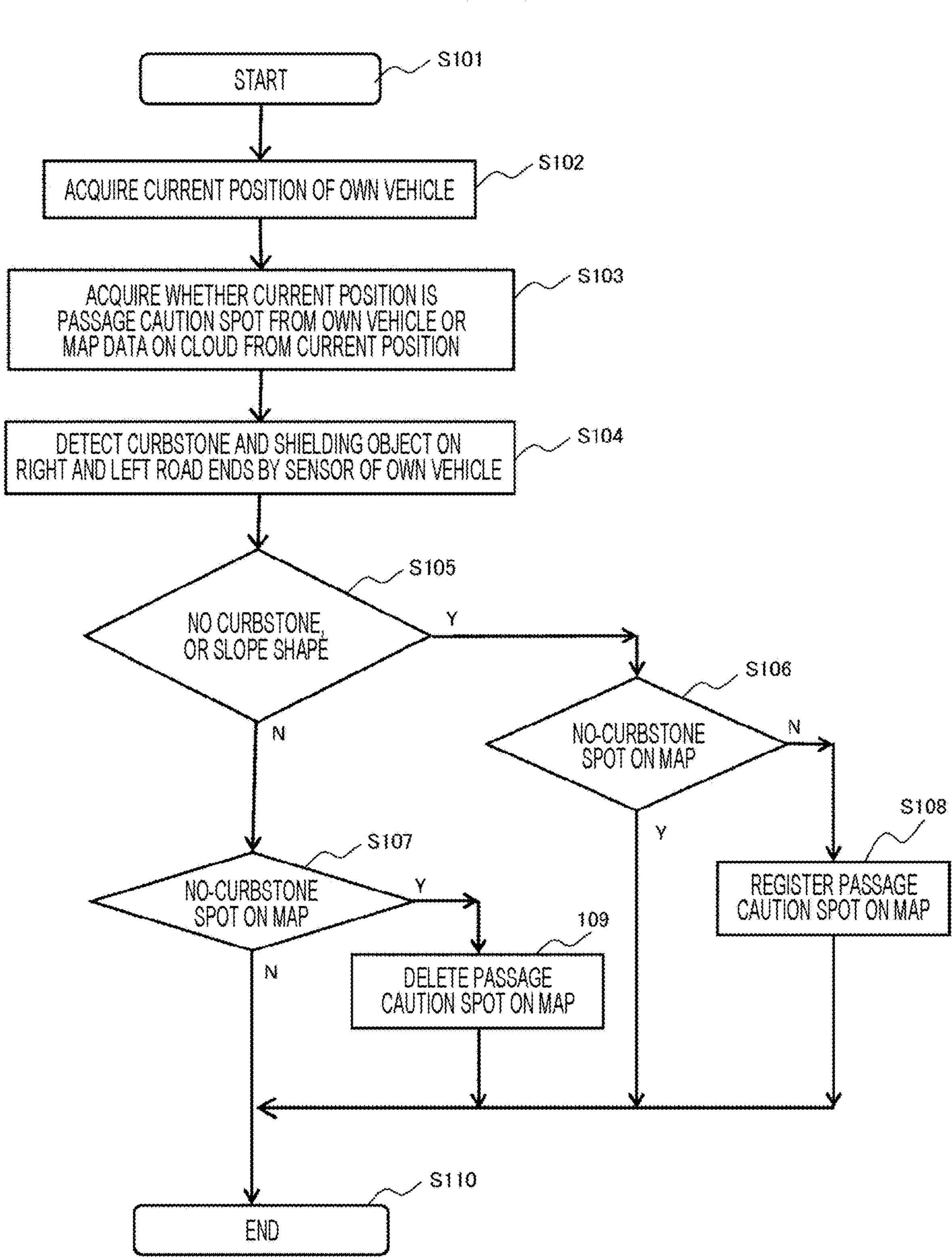
FIG. 3 is a processing flowchart in the first embodiment.

Next, FIG. 3 is a processing flowchart of the present embodiment. First, in step S101, this processing is started. This is desirably triggered by the start of the vehicle 1.

Next, in step S102, the position information acquisition sensor 6 acquires the current position of the vehicle 1, that is, the current position of an own vehicle. The position information acquisition sensor 6 continuously acquires the position information by using a GPS or the like.

In addition, in step S103, the vehicle driving control unit 10 determines whether the detected current position of the own vehicle is the passage caution spot on the basis of the passage caution spot information 8 and the map information 9.

Here, the passage caution spot information 8 and the map information 9 may be stored by the MPU 7 or may be stored by the map data management center 11.

In addition, the passage caution spot information 8 is information for specifying the position information of the passage caution spot which is a type of the step elimination region. In addition, the passage caution spot information 8 may be included in the map information 9, which is configured as one piece of information.

In addition, in step S104, the curbstone shape detection unit 3 detects a road surface situation such as curbstones and shielding objects on right and left road ends detected by the sensor 2. Then, in step S105, the passage caution spot detection unit 5 determines whether the road surface situation detected in step S104 indicates a step elimination region. In the present embodiment, the curbstone shape detection unit 3 determines whether there is a curbstone and whether a slope shape is formed. Here, these determinations can be realized by comparing with reference data stored in advance in the storage unit. In addition, it may be determined whether a height difference between the sidewalk 24 and the road 25 is a predetermined value or more. In this manner, in step S105, it may be determined whether an adjacent shape condition, which is a condition related to the adjacent shape of the sidewalk 24 and the road 25, satisfies a predetermined condition. Here, in a case where a plurality of conditions are used as the adjacent shape condition and in a case where at least one condition is satisfied, it is determined that the adjacent shape condition is satisfied.

As a result, in a case where the curbstone is present or a slope shape is formed (Y), the process proceeds to step S106. In addition, in a case where the curbstone is not present and a slope shape is not formed (N), the process proceeds to step S107.

Next, in step S106, the passage caution spot detection unit 5 determines whether the corresponding position determined in step S105 is a no-curbstone spot or a slope shape (passage caution spot) in the passage caution spot information 8. That is, it is determined whether it is recorded in the passage caution spot information 8.

As a result, in a case where it is determined that the position is no-curbstone spot or a slope shape (passage caution spot) (Y), the process ends (the process proceeds to step S110). In a case where there is a curbstone and the slope shape is not formed (not a passage caution spot) (N), the process proceeds to step S108.

Then, in step S108, the passage caution spot detection unit 5 performs update processing for adding the passage caution spot detected in step S105 to the passage caution spot information 8. Here, in a case where the passage caution spot information 8 is stored in the storage unit of the MPU 7, the passage caution spot detection unit 5 updates the passage caution spot information 8. In addition, in a case where the passage caution spot information 8 is stored in the storage unit of the map data management center 11, the passage caution spot detection unit 5 transmits an update command including the result detected in step S105 to the map data management center 11. Then, the map data management center 11 updates the passage caution spot information 8 stored therein. Note that, for this update processing, it is desirable to have an output unit that outputs the passage caution spot.

In addition, in step S107, the passage caution spot detection unit 5 determines whether the corresponding position determined in step S105 is a no-curbstone spot or a slope shape (passage caution spot) in the passage caution spot information 8. That is, similarly to step S106, it is determined whether it is recorded in the passage caution spot information 8. As a result, in a case where it is determined that the position is no-curbstone spot or a slope shape (passage caution spot) (Y), the process proceeds to step S109. In addition, in a case where there is a curbstone and the slope shape is not formed (not a passage caution spot) (N), the process ends (step S110).

Then, in step S109, the passage caution spot detection unit 5 performs update processing of deleting the corresponding position detected in step S105 from the passage caution spot information 8. Here, in a case where the passage caution spot information 8 is stored in the storage unit of the MPU 7, the passage caution spot detection unit 5 updates the passage caution spot information 8. In addition, in a case where the passage caution spot information 8 is stored in the storage unit of the map data management center 11, the passage caution spot detection unit 5 transmits an update command (deletion command) including the result detected in step S105 to the map data management center 11. Then, the map data management center 11 updates (deletes) the passage caution spot information 8 stored therein.

Note that, in steps S109 and S108, the passage caution spot detection unit 5 updates the passage caution spot information 8 of the MPU 7 and notifies the map data management center 11 of the result. As a result, the MPU and the 7 map data management center 11 may be synchronized in the passage caution spot information 8.

As above, the description of the basic processing flow according to the first embodiment is completed. Here, in the real world, there are a great number of passage caution spots where the curbstone of the road is cut or sloped. Therefore, in order to realize more efficient processing, it is more desirable to narrow down to those satisfying other road conditions among them. In this regard, as a modification of the first embodiment, this narrowing, that is, extraction processing will be described.

As an extraction method, the following (1) to (4) will be described as an example. Details of (1) to (4) will be described below.

(1) A spot where there is a branch of the road on the opposite side of a spot where a curbstone of the road is cut or sloped.

(2) A spot where it is difficult to see a pedestrian or a bicycle jumping out since there is a building on the sidewalk side of a spot where a curbstone of a road is cut or sloped.

(3) A spot where an uncut portion of a curbstone continues for a long distance, and the curbstone is cut ahead of the uncut portion.

(4) A spot, other than a road branch, a doorway of a building, or the like, where a spot where a curbstone is cut continues for a long distance Details of (1) to (4) will be described below.

<Extraction Method (1)>

Figure 4:
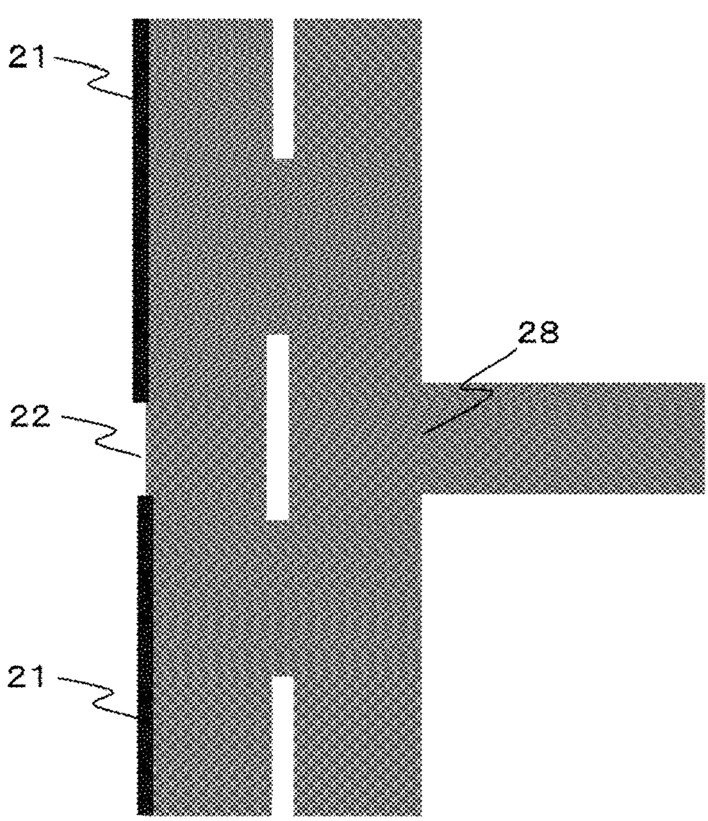
FIG. 4 is a diagram for explaining an extraction method (1) of the first embodiment.

FIG. 4 is a diagram for explaining an extraction method (1) of the present embodiment. In FIG. 4, a spot where there is a branch 28 on a road opposite to the spot 22 with no curbstone is defined as the passage caution spot. That is, in a case where the spot 22 with no curbstone is detected and the branch 28 is detected by the sensor 2, in step S105, the passage caution spot detection unit 5 determines that there is a passage caution spot which is a type of the step elimination region (Y). This is because the presence of the branch 28 increases a possibility that the attention of a driver is directed to the branch 28 or a bicycle or the like moves from the spot 22 with no curbstone toward the branch 28. For this reason, in the extraction method (1), the passage caution spot is extracted from the road illustrated in FIG. 4.

<Extraction Method (2)>

Figure 5:
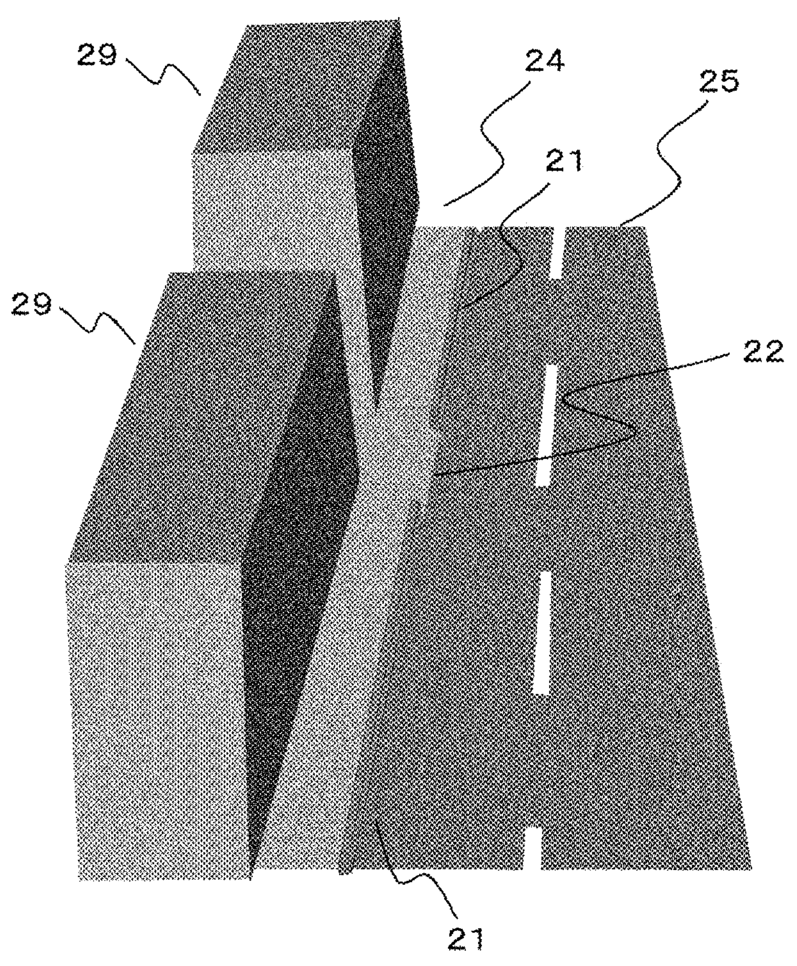
FIG. 5 is a diagram for explaining an extraction method (2) of the first embodiment.

FIG. 5 is a diagram for explaining an extraction method (2) of the present embodiment. In FIG. 5, a spot where there is a building 29 on the side of the sidewalk 24 of the spot 22 with no curbstone and visibility is poor is set as the passage caution spot. That is, in a case where the spot 22 with no curbstone is detected and the building 29 is detected by the sensor 2, in step S105, the passage caution spot detection unit 5 determines that there is a passage caution spot which is a type of the step elimination region (Y). This is because the presence of the building 29 make it difficult to recognize that a bicycle or the like moves from the sidewalk 24, and the present extraction method is adopted.

<Extraction Method (3)>

Figure 6:
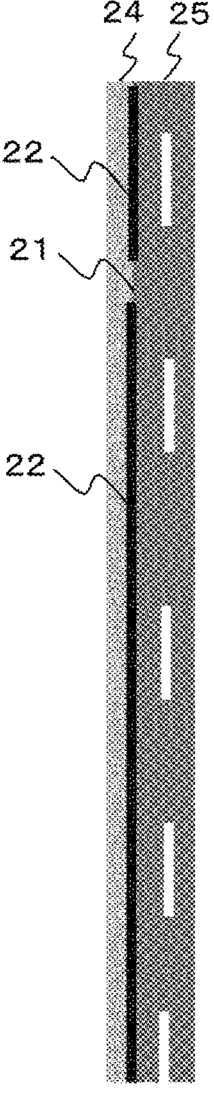
FIG. 6 is a diagram for explaining an extraction method (3) of the first embodiment.

FIG. 6 is a diagram for describing an extraction method (3) of the present embodiment. In FIG. 6, a case where there is the spot 22 with not no curbstone after a place with a curbstone continues for a long distance in the sidewalk 24 is defined as the passage caution spot. That is, in a case where the spot 22 with no curbstone is detected after the curbstone is detected by the sensor 2 for a predetermined length or more or a predetermined time or more, in step S105, the passage caution spot detection unit 5 determines that there is a passage caution spot which is a type of the step elimination region (Y). This is because a possibility that a bicycle or the like will run out increases after the curbstone continues.

<Extraction Method (4)>

Figure 7:
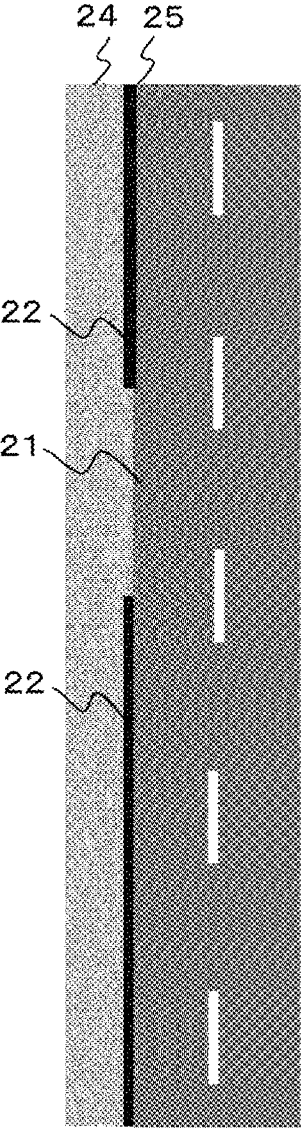
FIG. 7 is a diagram for explaining an extraction method (4) of the first embodiment.

FIG. 7 is a diagram for explaining an extraction method (4) of the present embodiment. In FIG. 7, in the sidewalk 24, a spot where the spot 22 where the curbstone is cut continues longer than a predetermined length is set as the passage caution spot. That is, in a case where the spot 22 with no curbstone is detected for a predetermined length or more, in step S105, the passage caution spot detection unit 5 determines that there is a passage caution spot which is a type of the step elimination region (Y). This is because a possibility that a bicycle or the like will run out increases as the length of the spot with no curbstone increases.

Note that in addition, a spot where braking is applied and deceleration is performed may be used as the extraction method.

As described above, in the present embodiment, narrowing can be performed in consideration of other road situations such as (1) to (4).

<Processing Flow to which Extraction Method is Applied>

Figure 8:
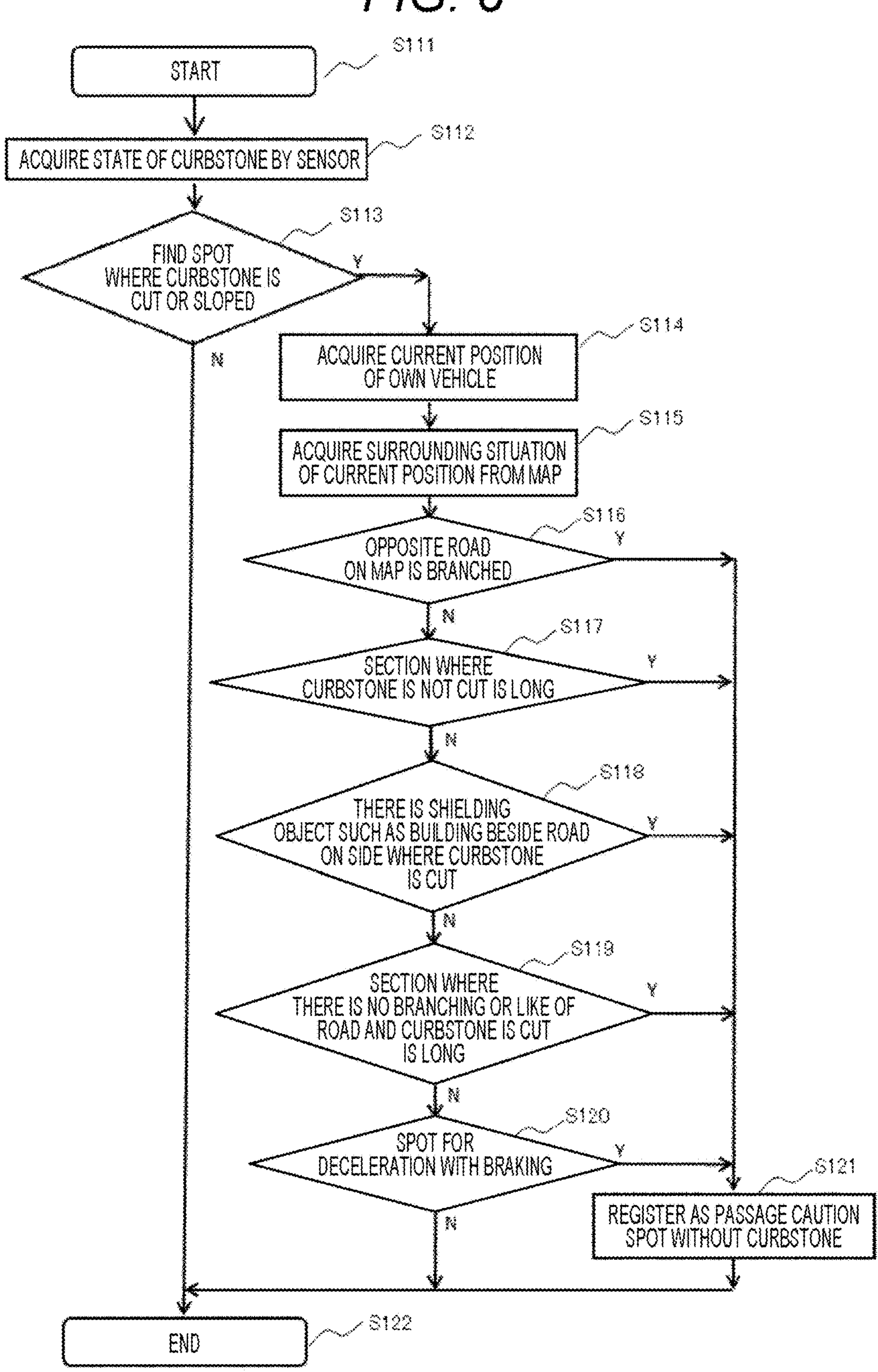
FIG. 8 is a processing flowchart in the first embodiment.

Next, a processing flow for executing the extraction methods (1) to (4) will be described. FIG. 8 is a processing flowchart for executing the extraction methods (1) to (4) which are modifications of the first embodiment. In step S111, this processing flow is started. This is the same processing as step S101. Next, in step S112, the sensor 2 detects a curbstone. That is, processing similar to that in step S104 is executed. Then, in step S113, processing similar to that in step S105 is executed. That is, the curbstone shape detection unit 3 determines whether there is a curbstone and whether a slope shape is formed. As a result, in a case where there is no curbstone and a slope shape is formed (Y), the process proceeds to step S114. In addition, in a case where there is a curbstone or a slope shape is not formed (N), this processing flow ends (step S122).

Next, in step S114, the current position of an own company is acquired by processing similar to that in step S102. Note that this step may continuously acquire the position information before step S113.

Next, in step S115, the passage caution spot detection unit 5 acquires the surrounding situation of the current position from the map information 9 or each sensor. The surrounding situation includes various situations used in the above-described extraction method. This situation is used in the following steps. Details thereof will be described below.

Next, in step S116, the passage caution spot detection unit 5 determines whether or not a road on the opposite side of a spot with no curbstone or a slope shape is branched. That is, processing corresponding to the extraction method (1) is executed. As a result, if branched (Y), the process proceeds to step S121. If not branched (N), the process proceeds to step S117.

Next, in step S117, the passage caution spot detection unit 5 determines whether or not a section where the curbstone is not cut is long. That is, processing corresponding to the extraction method (2) is executed. As a result, in a case where the section where the curbstone is not cut is long (Y), the process proceeds to step S121. In a case where the section where the curbstone is not cut is not long (N), the process proceeds to step S118.

Next, in step S118, the passage caution spot detection unit 5 determines whether or not there is a shielding object such as a building on the side of the road where the curbstone is cut. That is, processing corresponding to the extraction method (3) is executed. As a result, when there is a shielding object (Y), the process proceeds to step S121.

In a case where there is no shielding object (N), the process proceeds to step S119.

Next, in step S119, the passage caution spot detection unit 5 determines whether a section where there is no branching or the like of the road and the curbstone is cut is long. That is, processing corresponding to the extraction method (4) is executed. As a result, in a case where the section is long (Y), the process proceeds to step S121. In a case where the section is not long (N), the process proceeds to step S120.

Then, in step S120, the passage caution spot detection unit 5 determines, according to the shape of the road and the control command by the vehicle driving control unit 10, whether the section is a spot for deceleration. Note that the shape of the road can be specified by using detection content by various sensors or the map information 9. As a result, if the section is a spot for deceleration (Y), the process proceeds to step S121. If the section is not a spot for deceleration (N), the process proceeds to step S122, and this processing flow ends.

Note that, in a case where the process proceeds to step S122, the processing flow may not end, and processing similar to that in step S109 may be executed.

In addition, in step S121, the passage caution spot detection unit 5 specifies the spot specified in steps S116 to S120 as the passage caution spot. Then, update processing similar to that in step S109 is executed. In steps S116 to S120, at least one step may be executed, and the order is not limited.

Although the description of the processing flow of the first embodiment is completed as above, a part of this processing can be executed by a map data management center device (hereinafter, the map data management center 11) which is a server. For example, step S105 and subsequent steps may be executed by the map data management center 11.

In this case, it is desirable to use the passage caution spot information 8 and the map information 9 stored in the map data management center 11. Then, in a case where these are updated, the map data management center 11 notifies the MPU 7 of the update content. As described above, the present embodiment can be implemented as a map data management system including the map data management center 11 and the MPU 7. For this reason, the map data management center 11 includes a reception unit that receives various types of information such as the curbstone shape and the passage caution spot from the MPU 7, and an output unit that outputs various types of information such as the passage caution spot detection unit and the passage caution spot.

Further, a crosswalk may be detected as the passage caution spot. In this case, a detection result of an indication or a sign on the road surface may be used. Furthermore, in a case where the step elimination region continues for a predetermined length or more, the presence or absence of a protection fence may be determined, and this result may be used.

In addition, the update processing between the map data management center 11 and the MPU 7 may be executed each time the update processing is required, may be periodically executed, or may be executed after a predetermined amount of update content is collected. The periodic execution includes periodic updates, such as once a week. The description of the first embodiment is completed as above.

Second Embodiment

Figure 9:
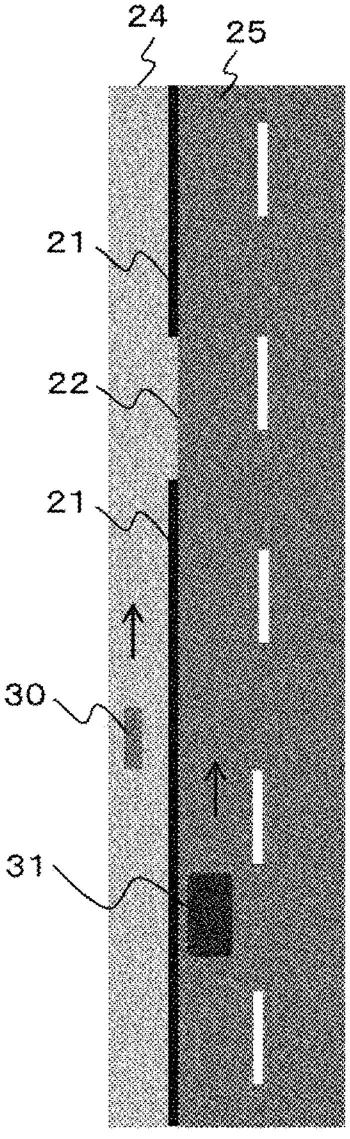
FIG. 9 is a diagram for explaining control of a vehicle in a second embodiment.
Figure 10:
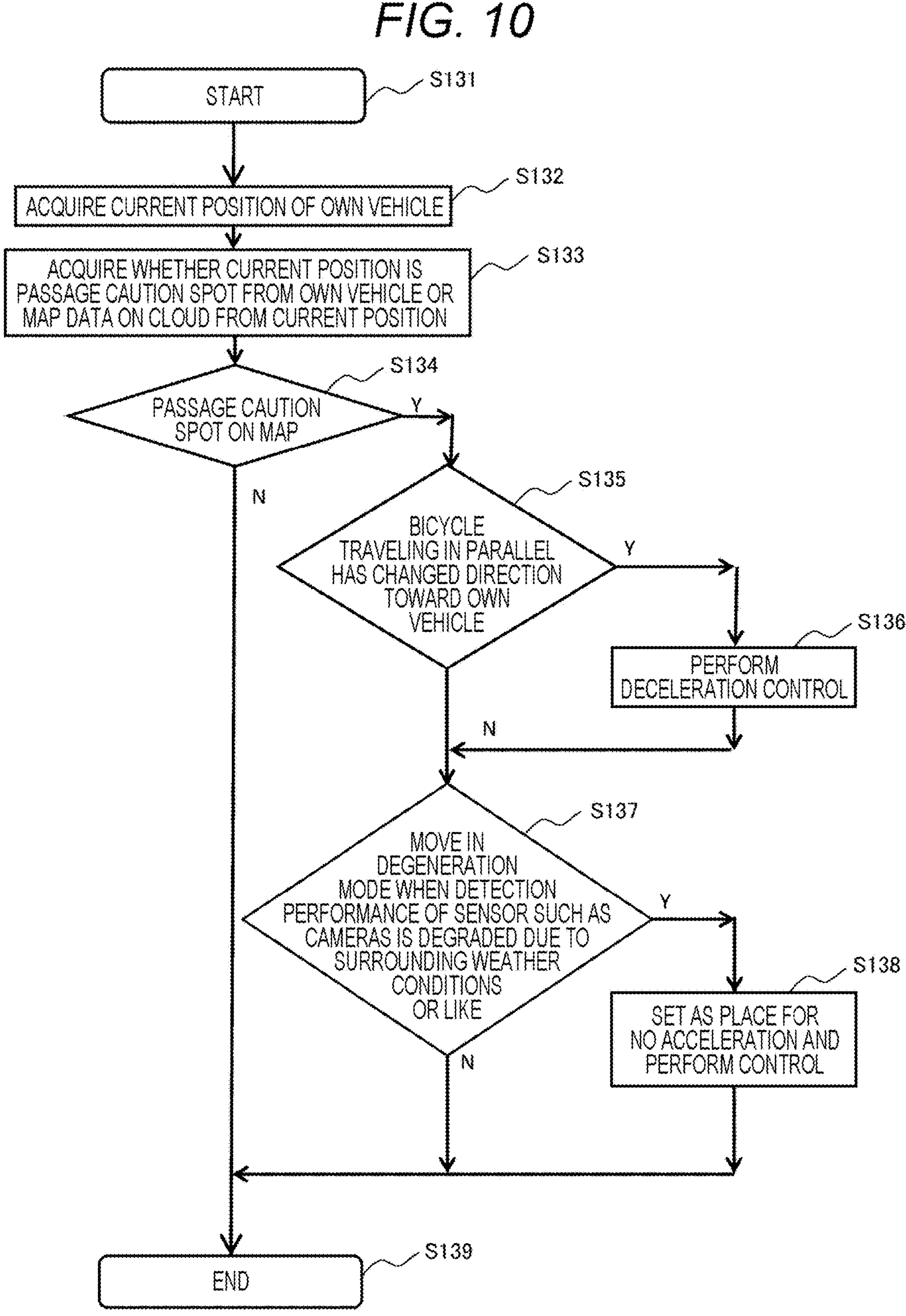
FIG. 10 is a control processing flowchart of a vehicle in the second embodiment.

Next, as a second embodiment, the control of the vehicle 1 using the passage caution spot information 8 created in the first embodiment will be described. FIG. 9 is a diagram for explaining the control of the vehicle in the second embodiment. FIG. 9 illustrates an aspect in which an own vehicle 31 (that is, the vehicle 1) to be controlled is traveling on the road 25 from the bottom to the top of the drawing. In addition, in FIG. 9, a bicycle 30 is traveling on the sidewalk 24 beside the road 25 in parallel with the own vehicle 31. In the present embodiment, the deceleration control is performed in a case where the bicycle 30 changes the traveling direction and looks as if the bicycle is about to jump out in front of the own vehicle 31 from the spot 22 with no curbstone. Hereinafter, the control flow of the vehicle including the deceleration control is illustrated in FIG. 10.

In step S131, this flow is started. Similarly to steps S101 and S111, this can be realized by using the start of the vehicle as a trigger.

Next, in step S132, processing similar to that in step S104 or S112 is performed.

In addition, in step S133, the vehicle driving control unit 10 acquires, from the passage caution spot information 8 of the MPU 7 or the map data management center 11, the passage caution spots around the current position acquired in a similar manner as that in step S114.

Next, in step S134, the vehicle driving control unit 10 determines whether the current position is the passage caution spot. As a result, in a case where the current position is the passage caution spot (Y), the process proceeds to step S135. In addition, in a case where the current spot is not the passage caution spot (N), the flow ends (step S139).

Next, in step S135, the vehicle driving control unit 10 determines whether the bicycle 30 has changed its direction to change the direction to an own vehicle direction (road 25) according to the detection content of the sensor 2. As a result, in a case where the direction is changed to the own vehicle direction (Y), the process proceeds to step S136. In addition, in a case where the direction is not changed to the own vehicle direction (N), the process proceeds to step S137. Then, in step S136, the vehicle driving control unit 10 performs deceleration control on the brake mechanism or the like.

Note that, in this step, (1) the necessity of that deceleration may be output to an in-vehicle terminal or the like, or (2) the deceleration control may be performed after (1) the output.

Next, in step S137, the vehicle driving control unit 10 determines, on the basis of the detection result of the sensor 2 and the like, whether the detection performance of the sensor 2 or the like is deteriorated due to the environmental situations such as ambient weather. Then, the vehicle driving control unit 10 determines whether it is a degeneration mode due to the deterioration in the detection performance. The degeneration mode indicates that a part of the automatic driving function is suppressed in order to prioritize safety. As a result, if it is the degeneration mode (Y), the process proceeds to step S138. In addition, if it is not the degeneration mode (N), this flow is ended (step S139). Note that this step can be omitted.

Next, in step S138, the vehicle driving control unit 10 controls the vehicle 1 by setting the current position acquired in step S32 as a place where acceleration is suppressed. Note that, in this step, (1) a fact that the position is a place where acceleration is suppressed is output to the in-vehicle terminal or the like or (2) the control may be performed after (1) the output. Then, the process proceeds to step S139, and the processing flow ends. The description of the second embodiment is completed as above.

Third Embodiment

Next, as a third embodiment, an evacuation control for evacuating the vehicle 1 in a case where an emergency occurs in the vehicle 1 will be described. In the third embodiment, the passage caution spot specified in the first embodiment is used as an evacuation place. Since the passage caution spot is available for the entry to the road 25 from the sidewalk 24, it is also possible to move in the opposite direction. In the third embodiment, the evacuation control is performed using this feature.

Figure 11:
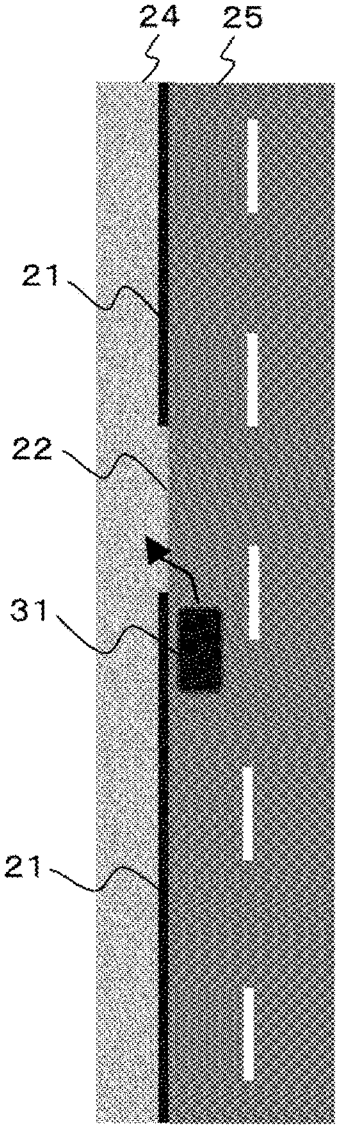
FIG. 11 is a diagram for explaining vehicle evacuation control in a third embodiment.

First, FIG. 11 is a diagram for describing the vehicle evacuation control in the third embodiment. In FIG. 11, in a case where it is necessary to evacuate, from the road 25, the own vehicle 31 (vehicle 1) in which some abnormality or emergency has occurred, the own vehicle is evacuated to the spot 22 where the curbstone is cut.

Figure 12:
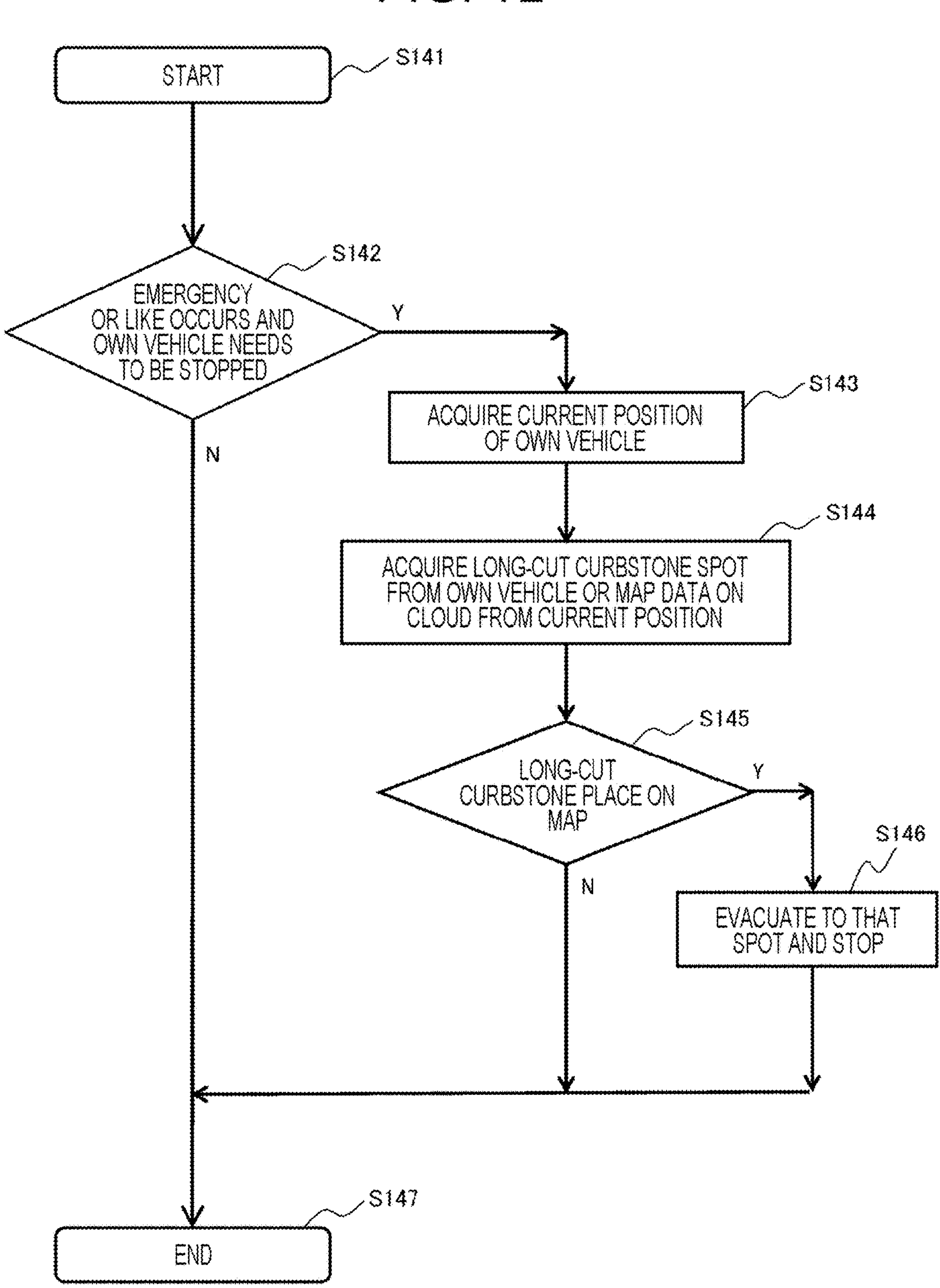
FIG. 12 is a flowchart of vehicle evacuation control processing in the third embodiment.

Next, a processing flow of the evacuation control will be described. FIG. 12 is a flowchart of vehicle evacuation control processing in the third embodiment.

In step S141, this flow is started. This can be realized by using the start of the vehicle as a trigger, similarly to step S141. Next, in step S142, the vehicle driving control unit 10 determines, by using the vehicle behavior detection sensor 4, the sensor 2, or the like, whether an abnormality or an emergency occurs in the vehicle 1 and it is necessary to evacuate. Here, the abnormality and the emergency include a failure of the vehicle 1 and natural disasters such as an earthquake and a fire. In addition, the evacuation includes stopping of the vehicle 1.

As a result of step S142, in a case where it is necessary to stop (Y), the process proceeds to step S142. In addition, in a case where it is not necessary to stop (N), this processing flow ends (step S147).

Next, in step S143, processing similar to that in step S132 is performed to acquire an own vehicle position. Then, in step S144, the vehicle driving control unit 10 acquires the passage caution spot from the passage caution spot information 8 of the storage unit of either the MPU 7 or the map data management center 11. In this case, it is desirable to acquire the long section where the curbstone is cut, the section being specified in step S117 of the first embodiment.

Next, in step S145, the vehicle driving control unit 10 determines whether the own vehicle position is the passage caution spot acquired in step S144 or within a predetermined range. As a result, in a case where the own vehicle position is the passage caution spot or within the predetermined range (Y), the process proceeds to step S146. On the other hand, in a case where the own vehicle position is not the passage caution spot or within the predetermined range (N), this processing flow ends (step S147). Note that in a case where the own vehicle position is not the passage caution spot or within the predetermined range (N), the process may return to step S143, and the subsequent processes may be looped. Note that a crosswalk is stored as the passage caution spot, this crosswalk may be excluded from the target of this processing.

Next, in step S146, the vehicle driving control unit 10 performs control for stopping at the passage caution spot acquired in step S144. Note that, in this step, note that, in this step, (1) a stop instruction may be output to the in-vehicle terminal or the like or (2) the stop control may be performed after (1) the output. Then, the process proceeds to step S147, and this processing flow ends. The description of the third embodiment is completed as above.

REFERENCE SIGNS LIST

1 vehicle
2 sensor
3 curbstone shape detection unit 4 vehicle behavior detection sensor
5 passage caution spot detection unit
6 position information acquisition sensor
7 MPU
8 passage caution spot information
9 map information
10 vehicle driving control unit
11 map data management center

The invention claimed is:

1. An in-vehicle information processing device which is connected to a sensor and provided in a moving body, the in-vehicle information processing device comprising:

a detector configured to:

detect a step situation on a road surface by using a road surface situation of a road on which the moving body moves, the road surface situation being detected by the sensor;

detect a step elimination region satisfying a predetermined condition on a basis of the step situation; and detect a passage caution spot based on passage caution spot information and map information; and a generator that outputs step elimination region information indicating the step elimination region and the passage caution spot information indicating whether the passage caution spot is in the step elimination region.

2. The in-vehicle information processing device according to claim 1, wherein the detector uses, as the predetermined condition of the step situation, an adjacent shape condition of the road and an adjacent region of the road.

3. The in-vehicle information processing device according to claim 2, wherein the detector determines, as the adjacent shape condition, whether a height difference is equal to or less than a predetermined value or an inclination is equal to or less than a predetermined value.

4. The in-vehicle information processing device according to claim 1, wherein the step elimination region information stored in advance is updated on a basis of the step elimination region information output by the generator.

5. The in-vehicle information processing device according to claim 4, further comprising a storage that stores the step elimination region information, wherein the generator updates the step elimination region information of the storage.

6. The in-vehicle information processing device according to claim 1, wherein the detector extracts, from the step elimination region, a step elimination region where another road situation detected by the sensor satisfies a predetermined condition.

7. A map data management center device which is provided in a moving body and connected to an in-vehicle information processing device connected to a sensor, the map data management center device comprising:

a receiver that receives, from the in-vehicle information processing device, a step situation on a road surface detected by using a road surface situation of a road on which the moving body moves, the road surface situation being detected by the sensor;

a detector configured to:

detect a step elimination region satisfying a predetermined condition on a basis of the step situation; and detect a passage caution spot based on passage caution spot information and map information; and generator that outputs step elimination region information indicating the step elimination region and the passage caution spot information indicating the passage caution spot.

8. The map data management center device according to claim 7, wherein the detector uses, as the predetermined condition of the step situation, an adjacent shape condition of the road and an adjacent region of the road.

9. The map data management center device according to claim 8, wherein the detector determines, as the adjacent shape condition, whether a height difference is equal to or less than a predetermined value or an inclination is equal to or less than a predetermined value.

10. The map data management center device according to claim 7, further comprising a storage that stores the step elimination region information, wherein the generator updates the step elimination region information of the storage.

11. The map data management center device according to claim 10, wherein the in-vehicle information processing device stores the step elimination region information, and the generator transmits, to the in-vehicle information processing device, an update instruction to update the step elimination region information of the in-vehicle information processing device.

12. The map data management center device according to claim 7, wherein the detector extracts, from the step elimination region, a step elimination region where another road situation detected by the sensor satisfies a predetermined condition.

13. A map data management system comprising:

the map data management center device according to claim 7; and the in-vehicle information processing device.

* * * * *